United States Patent
Walters et al.

(10) Patent No.: US 10,299,626 B2
(45) Date of Patent: May 28, 2019

(54) BARBECUE GRILLS

(71) Applicant: Phase 2, LLC, St. Louis, MO (US)

(72) Inventors: Jon Scott Walters, St. Louis, MO (US); Bryce G. Rutter, St. Louis, MO (US); Melvin Joshua Leedle, St. Louis, MO (US); Jeffery F. Feng, Chesterfield, MO (US)

(73) Assignee: Phase 2, LLC, St. Louis, MO (US)

( * ) Notice: Subject to any disclaimer, the term of this patent is extended or adjusted under 35 U.S.C. 154(b) by 0 days.

(21) Appl. No.: 16/224,418

(22) Filed: Dec. 18, 2018

(65) Prior Publication Data

US 2019/0117018 A1   Apr. 25, 2019

Related U.S. Application Data

(63) Continuation of application No. 15/948,318, filed on Apr. 9, 2018, now Pat. No. 10,159,381, which is a
(Continued)

(51) Int. Cl.
*A47J 37/07*   (2006.01)

(52) U.S. Cl.
CPC ....... *A47J 37/0759* (2013.01); *A47J 37/0704* (2013.01); *A47J 2202/00* (2013.01); *Y02A 40/928* (2018.01)

(58) Field of Classification Search
CPC ................ A47J 37/0704; A47J 37/0759; A47J 2202/00; Y02A 40/928
See application file for complete search history.

(56) References Cited

U.S. PATENT DOCUMENTS

| 43,155 A | 6/1864 | Lunt |
| 99,100 A | 1/1870 | Moore |

(Continued)

FOREIGN PATENT DOCUMENTS

| EP | 1479331 A1 | 11/2004 |
| WO | 96/24280 A1 | 8/1996 |

OTHER PUBLICATIONS

Krosaki Harima: Refractories business: "What is a refractory material?", <http://web.archive.org/web/20100127031146/http://www.krosaki.co.jp/en-glish/c4/c.sub.--4.sub.-1.html>, accessed on Mar. 6, 2014.

(Continued)

*Primary Examiner* — Alfred Basichas
(74) *Attorney, Agent, or Firm* — Stinson Leonard Street LLP

(57) ABSTRACT

A charcoal grill includes a vessel configured to hold and burn charcoal for cooking food. The charcoal grill may include a receptacle moveable between a first position in which the receptacle is positioned for collecting ashes from charcoal burned in the vessel and a second position in which the receptacle is separated from the vessel for disposal of the collected ashes. Additionally, or alternatively, the vessel may define a passage extending from an exterior side of the vessel to an interior side of the vessel for permitting a starter device to be inserted into the passage for igniting charcoal within the vessel. Additionally, or alternatively, the charcoal grill may include a vent system including at least one vent opening extending through a portion of the vessel, a vent cover movable with respect to the vent opening between a closed position and an open position, and at least one calibration associated with the vent cover between the closed position and the open position.

25 Claims, 13 Drawing Sheets

Related U.S. Application Data continuation of application No. 14/842,344, filed on Sep. 1, 2015, now abandoned, which is a continuation of application No. 13/113,762, filed on May 23, 2011, now Pat. No. 9,237,828.

(60) Provisional application No. 61/347,203, filed on May 21, 2010.

(56) References Cited

U.S. PATENT DOCUMENTS

| | | |
|---|---|---|
| 121,667 A | 12/1871 | Schuyler |
| 136,418 A | 3/1873 | Connelly |
| 253,144 A | 1/1882 | Willi |
| 314,093 A | 3/1885 | Williamson |
| 625,186 A | 5/1899 | Mitiska |
| 757,435 A | 4/1904 | Blum |
| 819,681 A | 5/1906 | Weddington |
| 849,546 A | 4/1907 | Johnson et al. |
| 962,152 A | 6/1910 | Kline |
| 1,438,345 A | 12/1922 | Tait et al. |
| 1,723,629 A | 8/1929 | Pickup |
| 2,210,996 A | 8/1937 | Woods |
| 2,408,921 A | 10/1946 | Esson |
| 2,690,870 A | 10/1954 | Harman |
| 2,733,708 A | 2/1956 | Hagen |
| 3,126,881 A | 3/1964 | Blotsky, Jr. |
| 3,276,440 A | 10/1966 | Sazegar |
| 3,279,452 A | 10/1966 | Hottenroth et al. |
| 3,318,330 A | 5/1967 | Dobbs |
| 3,380,444 A | 4/1968 | Stalker |
| 3,421,495 A | 1/1969 | Winegardner |
| 3,556,078 A | 1/1971 | McGaughey |
| 3,753,431 A | 8/1973 | Koziol |
| 3,765,397 A | 10/1973 | Henderson |
| 3,915,144 A | 10/1975 | Tomita |
| 4,321,857 A | 3/1982 | Best |
| 4,489,706 A | 12/1984 | Hait |
| 4,510,916 A | 4/1985 | Ogden |
| 4,569,327 A | 2/1986 | Velten |
| 4,607,609 A | 8/1986 | Keating |
| 4,763,640 A | 8/1988 | Schnack et al. |
| 4,809,671 A | 3/1989 | Vallego, Jr. |
| 4,823,684 A | 4/1989 | Traeger et al. |
| 4,901,196 A | 2/1990 | Grzybowski |
| 5,016,607 A | 5/1991 | Doolittle et al. |
| 5,036,832 A | 8/1991 | Schlosser et al. |
| 5,042,451 A | 8/1991 | Beller |
| 5,086,753 A | 2/1992 | Berger |
| 5,094,221 A | 3/1992 | Ho |
| 5,190,027 A | 3/1993 | Miceli |
| 5,429,110 A | 7/1995 | Burke et al. |
| 5,588,420 A | 12/1996 | Dickson |
| 5,617,840 A | 4/1997 | Clifford |
| 5,676,049 A | 10/1997 | Arnold |
| 5,836,295 A | 11/1998 | Faraj |
| 6,071,740 A | 6/2000 | Kerouac |
| 6,321,640 B1 | 11/2001 | Tseng |
| 6,363,925 B1 | 4/2002 | Chavana, Jr. et al. |
| 6,399,924 B1 | 6/2002 | Cai |
| 6,827,076 B2 | 12/2004 | Crawford et al. |
| 7,575,002 B2 | 8/2009 | DeMars et al. |
| 7,644,711 B2 | 1/2010 | Creel |
| 9,237,828 B2 | 1/2016 | Walters et al. |
| 2003/0075166 A1 | 4/2003 | Glass |
| 2004/0123857 A1 | 7/2004 | Viraldo |
| 2005/0126556 A1 | 6/2005 | Bossler |
| 2006/0225723 A1 | 10/2006 | Yu |
| 2007/0047166 A1 | 3/2007 | Creel |
| 2007/0220849 A1 | 9/2007 | Ryan |
| 2008/0098902 A1 | 5/2008 | Mansfield et al. |
| 2008/0227704 A1 | 9/2008 | Cookson et al. |
| 2009/0025574 A1 | 1/2009 | Byrnes et al. |
| 2009/0107480 A1 | 4/2009 | DeMars et al. |
| 2009/0308373 A1 | 12/2009 | Scott |
| 2010/0089380 A1 | 4/2010 | DeMars |
| 2010/0252021 A1 | 10/2010 | Bryce et al. |
| 2010/0258106 A1 | 10/2010 | Simms, II |
| 2011/0283990 A1 | 11/2011 | Walters et al. |
| 2013/0225057 A1 | 8/2013 | Merritt |
| 2014/0326372 A1 | 11/2014 | Simon et al. |

OTHER PUBLICATIONS

Mechanical Metals: "Refractory Anchors and Other Metal Refractory Products", <http://www.mechanicalmetals.com/anchors-insulation/>, accessed on Mar. 6, 2014.

"Calibration". In Chambers 21st Century Dictionary, edited by Maid Robinson and George Davidson. London: Chambers Harrap, 2001, <http://search.credoreference.com/content/entry/chambdict/calibration/- 0>, accessed on Oct. 8, 2014.

"Kamado". <http.//en.wikipedia.org/wiki/Kamado>, Sep. 6, 2009, accessed via <http://web.archive.org/web/20090906220951/http: en.wikipedia.org/wiki/-Kamado>, accessed on Oct. 8, 2014.

"Kamado Stainless Steel Gas Burner System", Kamado Corporation, <http://www.kamado.com/gas.htm>, accessed on May 1, 2006, 8 pages.

"Users User's Manual", Sample Kamado Owners Manual, 29 pages.

BARBECUE GRILLS

CROSS-REFERENCE TO RELATED APPLICATIONS

This application is a continuation of U.S. patent application Ser. No. 15/948,318 filed Apr. 9, 2018, which is a continuation of U.S. patent application Ser. No. 14/842,344 filed Sep. 1, 2015, which is a continuation of U.S. patent application Ser. No. 13/113,762 filed May 23, 2011, now U.S. Pat. No. 9,237,828, which claims the benefit of provisional U.S. Application No. 61/347,203 filed May 21, 2010. The entire disclosures of each of the above applications are incorporated herein by reference.

FIELD OF THE INVENTION

The present disclosure generally relates to barbecue grills for cooking and/or smoking food and, more particularly, to charcoal barbecue grills.

BACKGROUND OF THE INVENTION

This section provides background information related to the present disclosure which is not necessarily prior art.

Many different types of barbecue grills are known for cooking and/or smoking meats and other types of food. These grills can generally be divided into two types: gas-fueled grills and charcoal grills. Gas-fueled grills commonly use liquid propane or natural gas as the primary fuel for cooking food over gas burners. In contrast, charcoal grills are configured to hold and burn charcoal to generate heat for cooking food. Of these two grill types, charcoal grills are widely regarded by grilling enthusiasts as imparting the best flavor to foods. Charcoal grills are commonly available in a variety of configurations including, for example, kettle-style charcoal grills, barrel-style charcoal grills, kamado-style charcoal grills, etc.

BRIEF SUMMARY OF THE INVENTION

This section provides a general summary of the disclosure, and is not a comprehensive disclosure of its full scope or all of its features.

According to one aspect of the present disclosure, a kamado-style charcoal grill includes a vessel configured to hold and burn charcoal for cooking food, and a receptacle moveable between a first position in which the receptacle is positioned for collecting ashes from charcoal burned in the vessel and a second position in which the receptacle is separated from the vessel for convenient removal and disposal of the collected ashes by a user.

According to another aspect of the present disclosure, a charcoal grill includes a vessel configured to hold and burn charcoal for cooking food. The vessel defines a passage extending from an exterior side of the vessel to an interior side of the vessel. The passage permits a starter device to be inserted into the passage by a user from the exterior side of the vessel for igniting charcoal within the vessel, and removed from the passage from the exterior side of the vessel.

According to still another aspect of the present disclosure, a charcoal grill includes a vessel configured to hold and burn charcoal for cooking food, and a vent system including at least one vent opening extending through a portion of the vessel, a vent cover movable with respect to the vent opening between a closed position and an open position, and at least one calibration associated with the vent cover between the closed position and the open position.

Further areas of applicability will become apparent from the description provided herein. It should be understood that various aspects of this disclosure may be implemented individually or in combination with one or more other aspects, elements or features described herein and/or illustrated in the drawings, and in a wide variety of configurations. Accordingly, it should be understood that the description and specific examples in this disclosure are intended for purposes of illustration only and are not intended to limit the scope of the present disclosure.

BRIEF DESCRIPTION OF THE SEVERAL VIEWS OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE INVENTION

Figure 1:
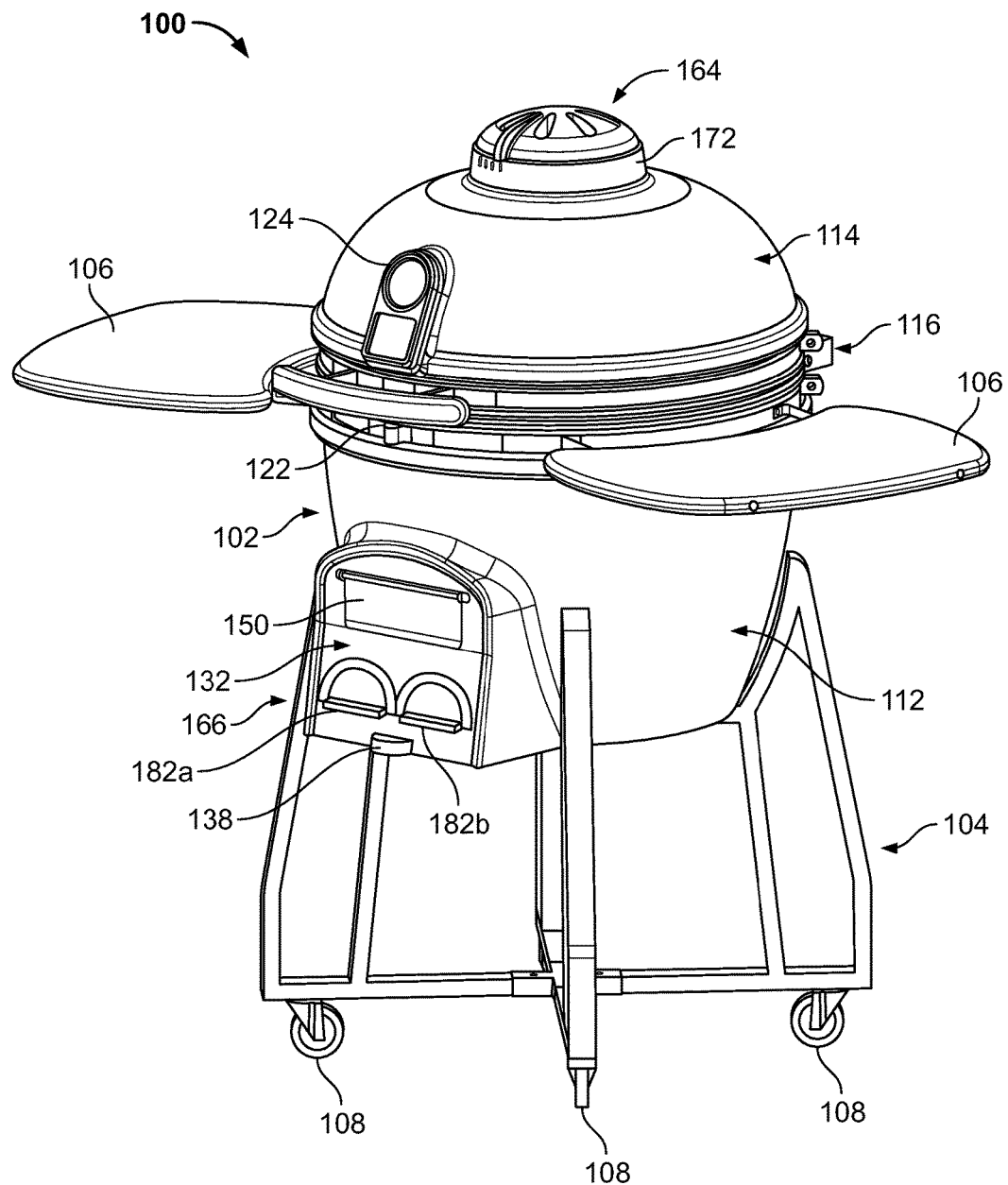
FIG. 1 is a perspective view of a charcoal grill according to one example embodiment of the present disclosure with a cover of the charcoal grill shown in a closed position.

Example embodiments are provided herein so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As will be apparent, the teachings of this disclosure can be implemented in a wide variety of charcoal grills of various types, sizes and configurations (each referred to as an embodiment). For example, the various teachings of this disclosure can be applied to kettle-style charcoal grills and barrel-style charcoal grills that are commonly formed of steel, as well as kamado-style charcoal grills that are typically formed of clay, high fire ceramics, refractory materials, traditional terra cotta, cement rock compositions, etc.

Each charcoal grill typically includes a vessel of some type configured to hold and burn charcoal to generate heat for cooking food (e.g., by searing, grilling, baking, smoking, steaming, etc.). While natural lump charcoal and charcoal briquettes are typically preferred, wood may also be used as fuel in a charcoal grill. Accordingly, as used herein, the term "charcoal" should be understood to include wood.

A charcoal grill constructed according to this disclosure may include a receptacle for collecting ashes. The receptacle may be moveable between a first position in which the receptacle is positioned for collecting ashes from charcoal burned in the vessel, and a second position in which the receptacle is separated from the vessel for convenient removal and disposal of the collected ashes by a user. The receptacle may be configured for insertion into an opening through the vessel. The receptacle may also form a portion (such as a bottom portion) of the vessel when the receptacle is in the first position. One or more mechanical structures may also be provided for retaining the receptacle in the first position. These mechanical structures may be integral with or separate from the receptacle and/or vessel.

Additionally, or alternatively, a charcoal grill constructed according to this disclosure may include a vessel that defines a passage extending from an exterior side of the vessel to an interior side of the vessel. The passage is configured (i.e., with a size and/or shape) to permit a starter device to be inserted into the passage by a user from the exterior side of the vessel for igniting charcoal within the vessel. Suitable starter devices include electric starters (typically having an electric coil or loop), butane starters, matches, etc. The passage can be positioned so that the starter device can be inserted below a grate supporting charcoal in the vessel for igniting the charcoal from the bottom side of the grate. Preferably, the starter device can be removed from the passage after igniting the charcoal without also removing burning charcoal. A cover panel may be provided to selectively allow and inhibit access to the passage from the exterior side of the grill. If the grill is provided with a receptacle for collecting ashes and a passage for inserting a starter device, these features can be implemented separately or integrated into a single removable unit that includes the ash receptacle.

Further, a charcoal grill constructed according to the present disclosure may also (or alternatively) include a vent system that includes at least one vent opening extending through a portion of the vessel, a vent cover movable with respect to the vent opening between open and closed positions, and at least one calibration associated with the vent cover between the closed position and the open position. Each calibration may correspond to a particular level of airflow through the charcoal grill and may provide for graduated amounts of airflow (e.g., on a graduated scale from no airflow to high airflow, etc.). If multiple vent openings and vent covers are employed, each may be provided with one or more independent calibrations. Alternatively, a continuous series of calibrations may be associated with two or more vent covers. The calibrations may be positioned on moving or non-moving portions of the charcoal grill, including on the vent covers, on non-moving portions of the vessel adjacent the vent covers, etc. A vent opening, vent cover and associated calibration may be positioned on a lower portion or an upper portion of the charcoal grill, or both, for selectively allowing air to enter and/or exit the vessel under user control. If the grill is also provided with a receptacle for collecting ashes, the vent system can be implemented separately or integrated into a single removable that includes the ash receptacle.

It should be appreciated that individual elements or features of particular example embodiments described herein are generally not limited to those particular embodiments, but, where applicable, are interchangeable and can be used in other selected embodiments, even if not specifically shown or described. The same may also be varied in many ways. Thus, charcoal grills may have any desired combination of aspects, elements and/or features described herein.

One example embodiment of a kamado-style charcoal grill having an ash receptacle, a passage for a starter device and at least one calibrated vent system will now be described with reference to FIGS. 1-12. It should be understood, however, that the teachings of this disclosure are not so limited, and can be applied to a wide variety of other charcoal grills having, for example, only an ash receptacle, only a passage for a starter device, or only a calibrated vent system.

Figure 2:
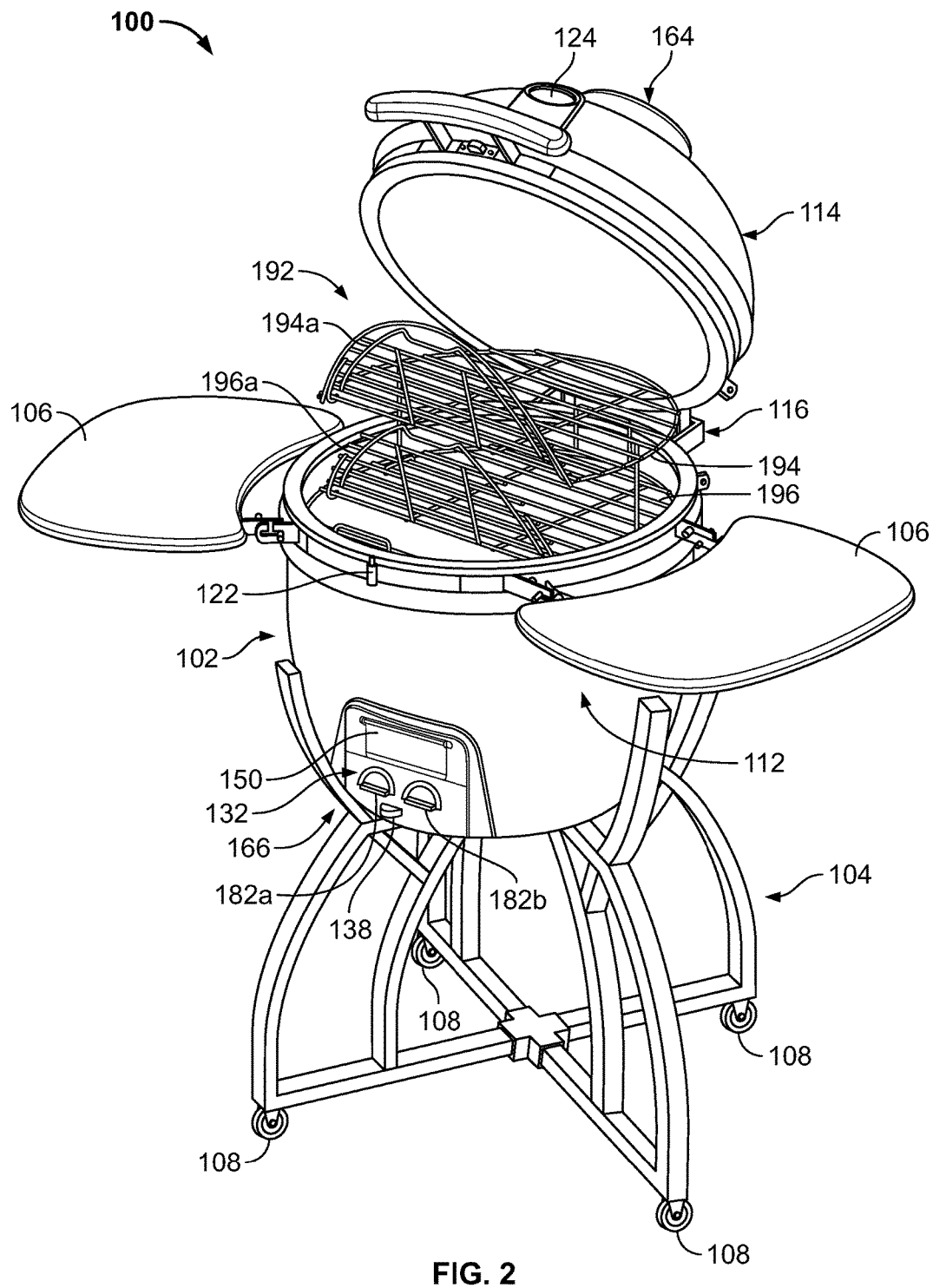
FIG. 2 is a perspective view of the charcoal grill of FIG. 1 with the cover of the charcoal grill shown in an open position, and with upper and lower cooking surfaces of a cooking rack shown pivoted upward.
Figure 3:
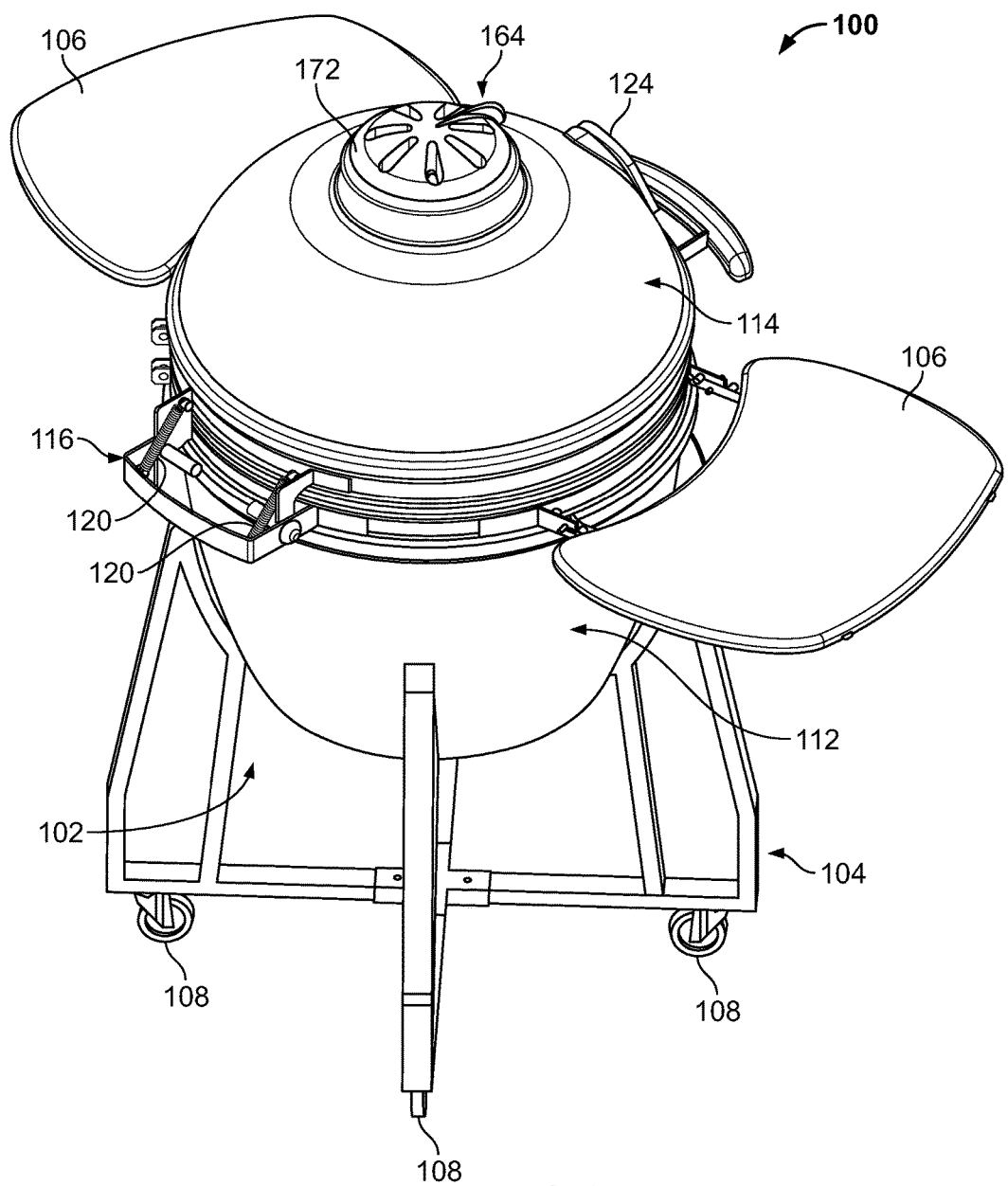
FIG. 3 is another perspective view of the charcoal grill of FIG. 1.

As shown in FIGS. 1-3, the illustrated charcoal grill 100 generally includes a vessel 102, a support structure 104 holding the vessel 102, and shelves 106 coupled to side portions of the vessel 102. The support structure 104 is configured to hold the vessel 102 in a secure position and at a desired height for cooking operation. And, the shelves 106 provide space, for example, for supporting items when using the charcoal grill 100. The illustrated support structure 104 includes multiple castors 108 such that the support structure 104 can roll as desired for moving the charcoal grill 100. In other example embodiments, support structures may alternatively be stationary-type structures (e.g., structures without wheels, etc.), etc. for supporting charcoal grills.

In the illustrated embodiment, the vessel 102 includes a lower base 112 and an upper cover 114. The cover 114 is pivotally coupled to the base 112 by a hinge structure 116. This allows the cover 114 to pivot between a closed position in which the cover 114 is positioned over the base 112 and an open position in which the cover 114 allows access into the base 112 (e.g., to access charcoal, food, etc.). The hinge structure 116 includes a spring-assist feature configured to help with opening and closing movement of the cover 114. In the illustrated assembly, this feature includes springs 120 tensioned toward the open position of the cover 114 to assist with opening movement of the cover 114 by urging the cover 114 to pivot to the open position. The springs 120 also help hold the cover 114 in the open position and resist closing movement of the cover 114 (helping a user generally close the cover 114, and inhibiting the cover 114 from inadvertently slamming closed).

Figure 4:
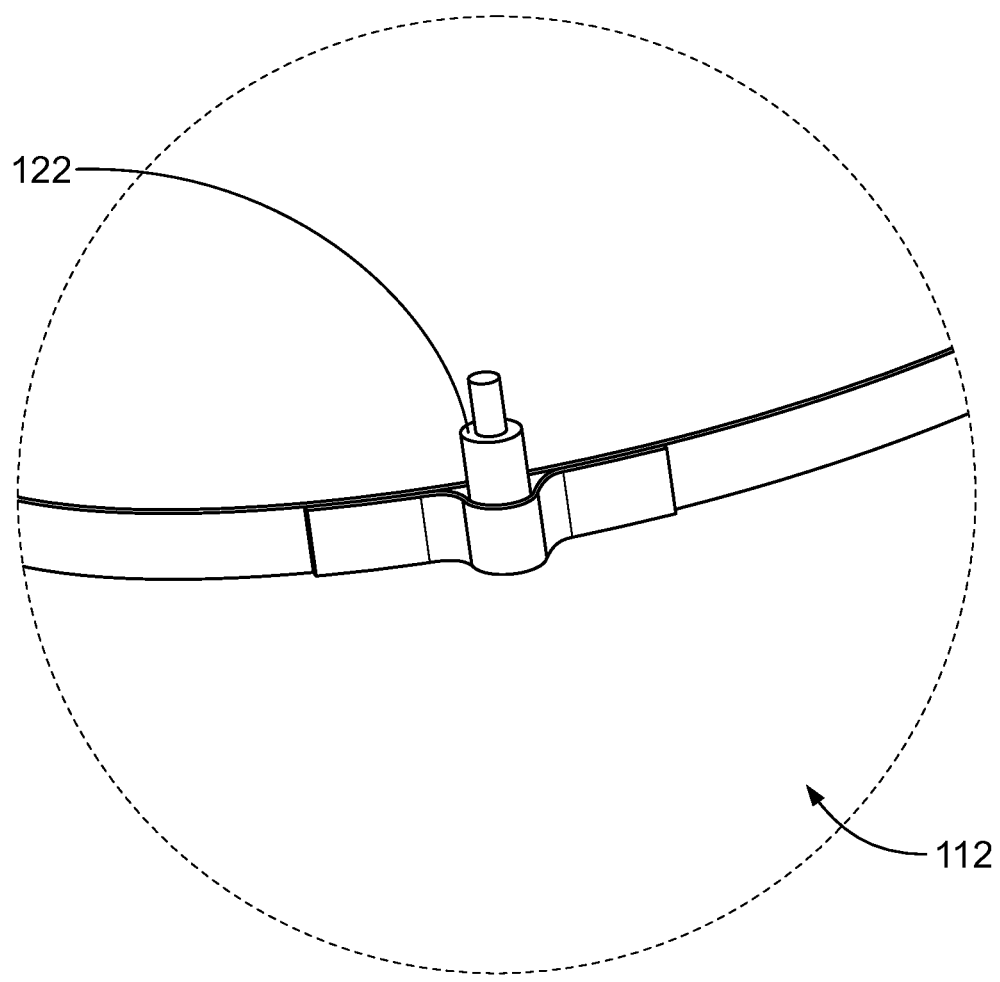
FIG. 4 is an enlarged perspective view of a shock absorber of the charcoal grill of FIG. 1, configured to help inhibit the cover of the charcoal grill from slamming against a base of the charcoal grill when moving to the closed position.

The vessel 102 also includes a shock absorber 122 mounted to the base 112 of the vessel 102 to further help inhibit the cover 114 from slamming against the base 112 when moving to the closed position. An enlarged view of the shock absorber 122 is shown in FIG. 4. For example, as the cover 114 moves to the closed position, the shock absorber 122 operates to initially engage the cover 114 and dampen the closing impact before the cover 114 actually engages the base 112. This feature can substantially help protect the cover 114 and base 112 from damage, for example, if the cover 114 suddenly falls to the closed position, etc. In the illustrated embodiment, the shock absorber 122 includes a spring-based structure mounted to a forward portion of the base 112. In other example embodiments, shock absorbers may include other structures such as, for example, fluid-based structures, magnetic-based structures, etc. located as desired on the vessel 102.

In the illustrated embodiment, a temperature control unit 124 (e.g., a thermometer, etc.) is positioned within the cover 114 of the vessel 102. The temperature control unit 124 operates to measure and/or monitor temperature within the charcoal grill 100 as needed.

Figure 5:
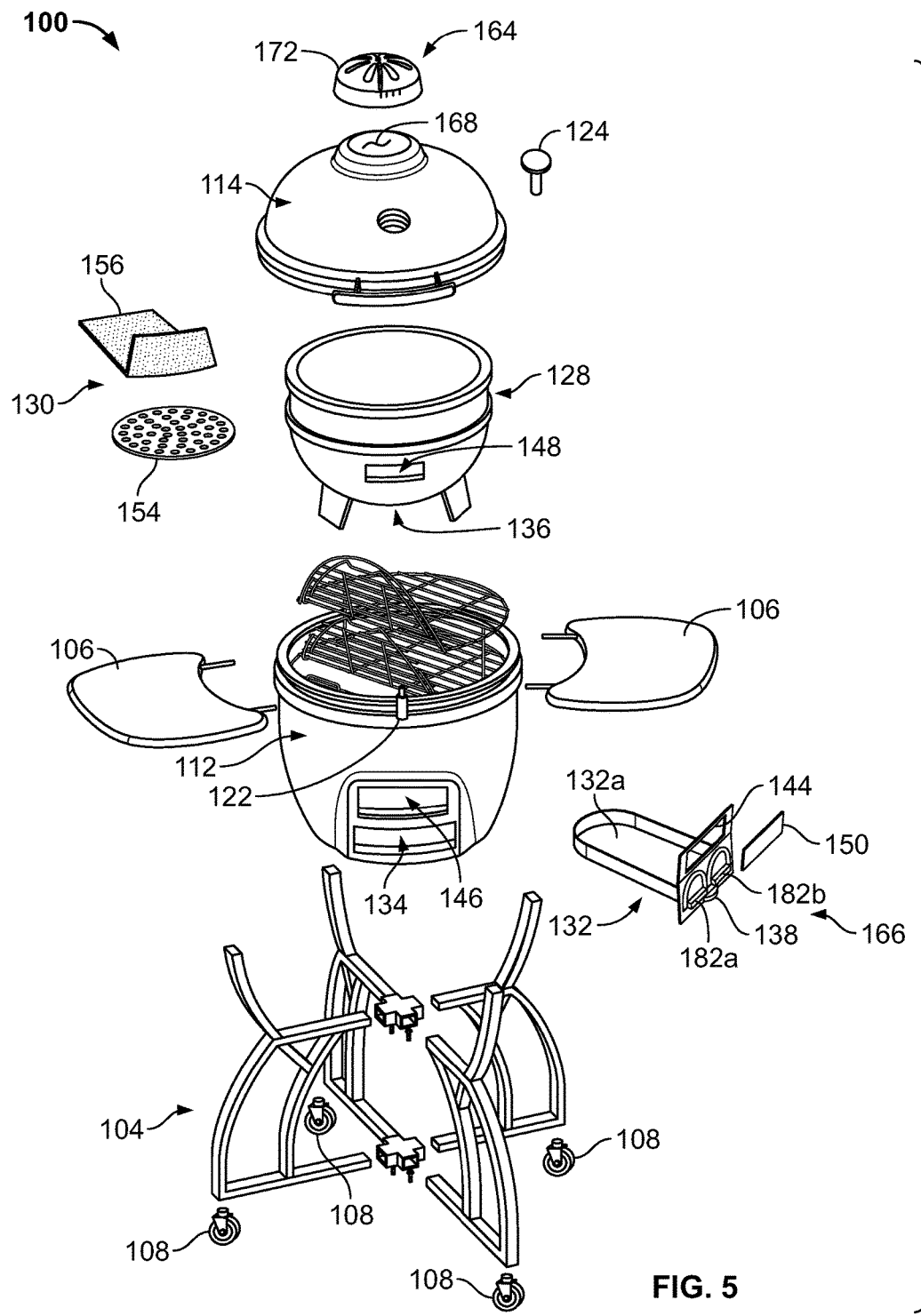
FIG. 5 is an exploded perspective view of the charcoal grill of FIG. 1.
Figure 6:
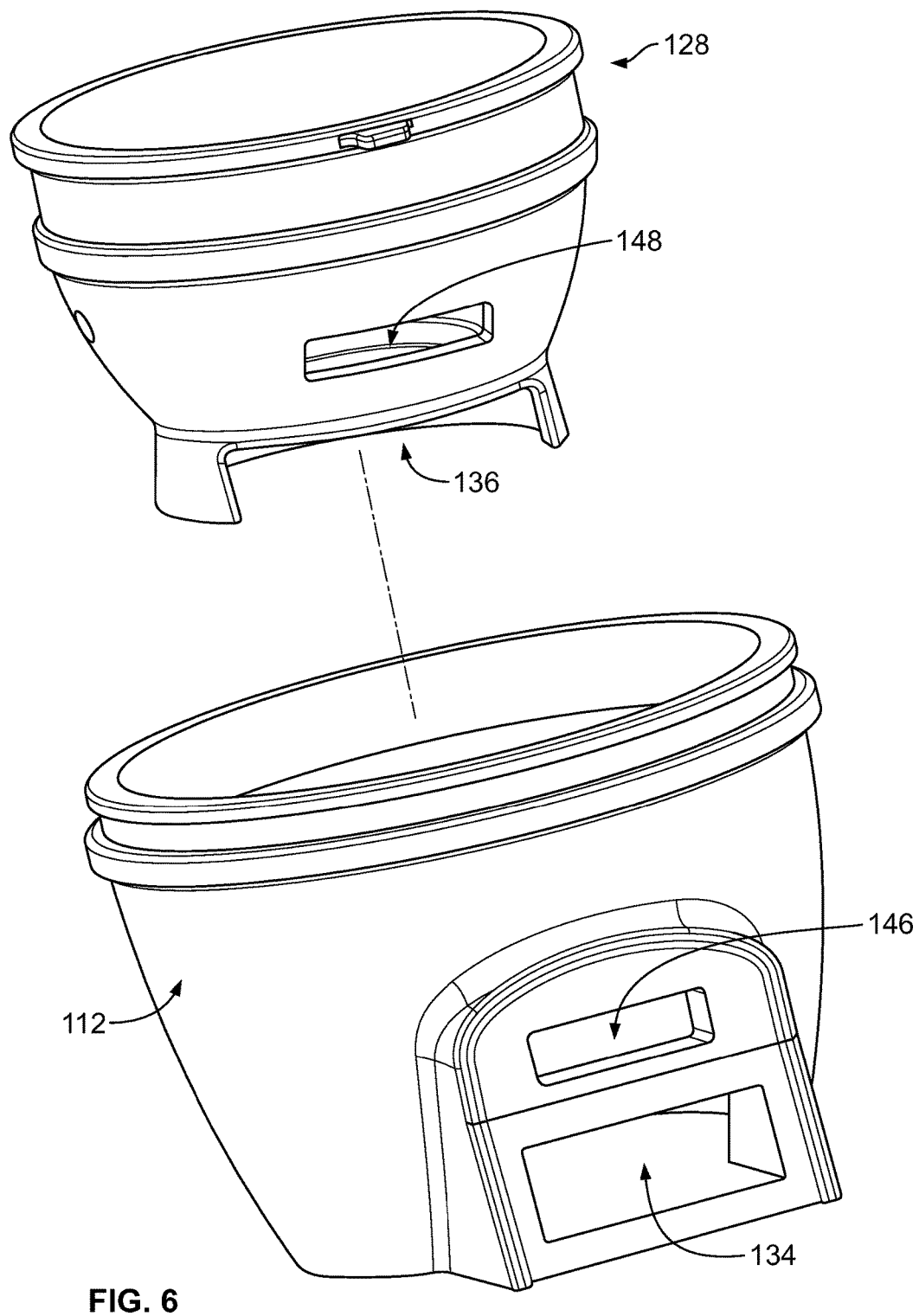
FIG. 6 is a perspective view of a fire bowl of the charcoal grill of FIG. 1 shown above the base of the charcoal grill.
Figure 7:
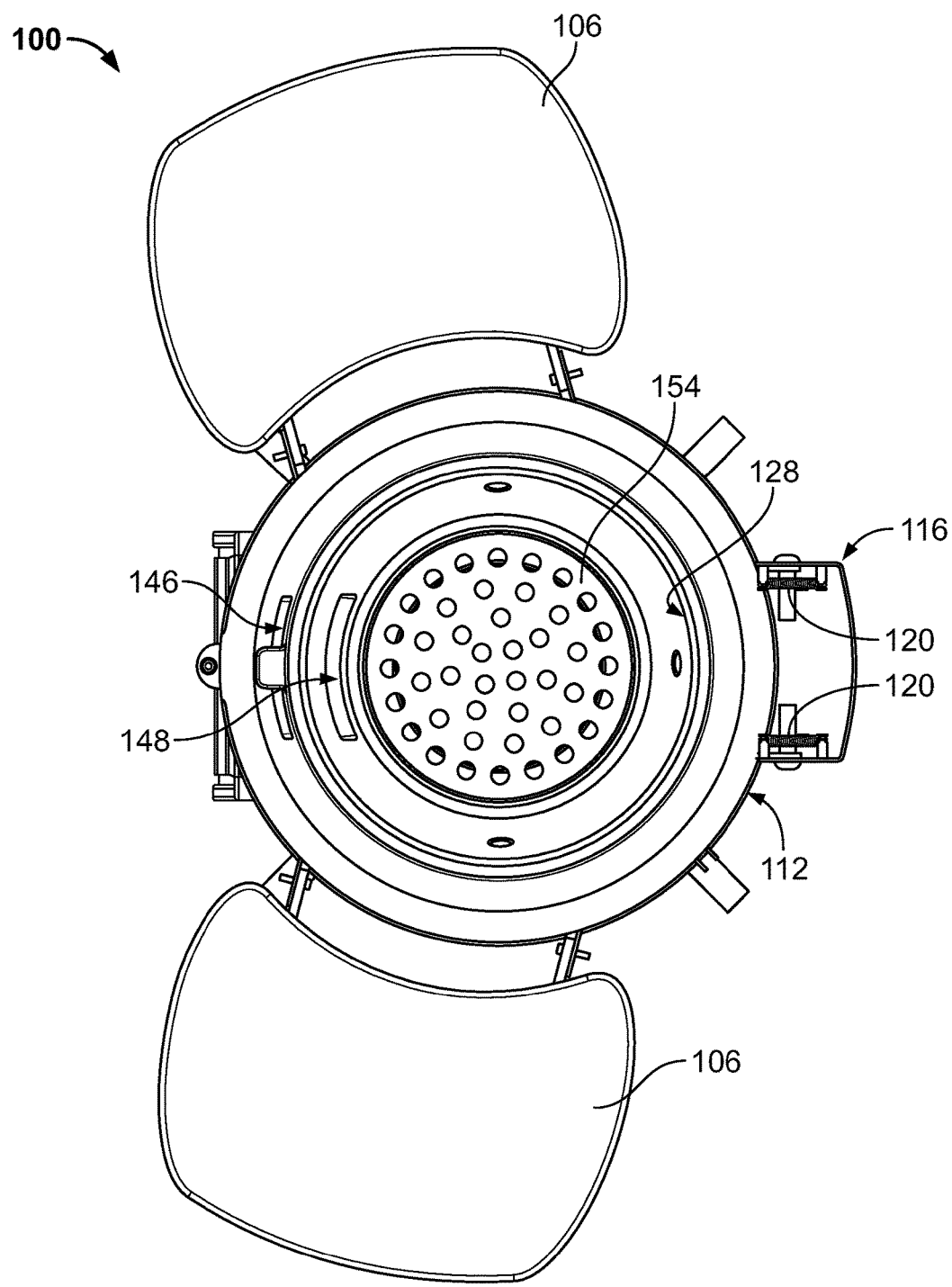
FIG. 7 is a top plan view of the charcoal grill of FIG. 1 with the cover removed to illustrate interior components of the charcoal grill.

With reference now to FIGS. 5-7, the illustrated charcoal grill 100 also includes a fire bowl 128 configured to be disposed within the vessel 102 and configured to hold charcoal in the vessel 102 (and allow the charcoal to burn) for use in cooking food. The fire bowl 128 is removably positioned within the vessel 102 such that it can be removed from the vessel 102 and then subsequently positioned back in the vessel 102 as desired. This can allow the fire bowl 128 to be easily cleaned, if need, separate from the vessel 102. A grate structure 130 is positionable within the fire bowl 128 for supporting the charcoal in the fire bowl 128 during use of the charcoal grill 100 (only part of the grate structure 130 is shown in the fire bowl 128 in FIG. 7). The fire bowl 128 may be formed from suitable materials such as, for example, high fire ceramics, refractory materials, traditional terra cotta, cement rock compositions, etc.

Figure 8:
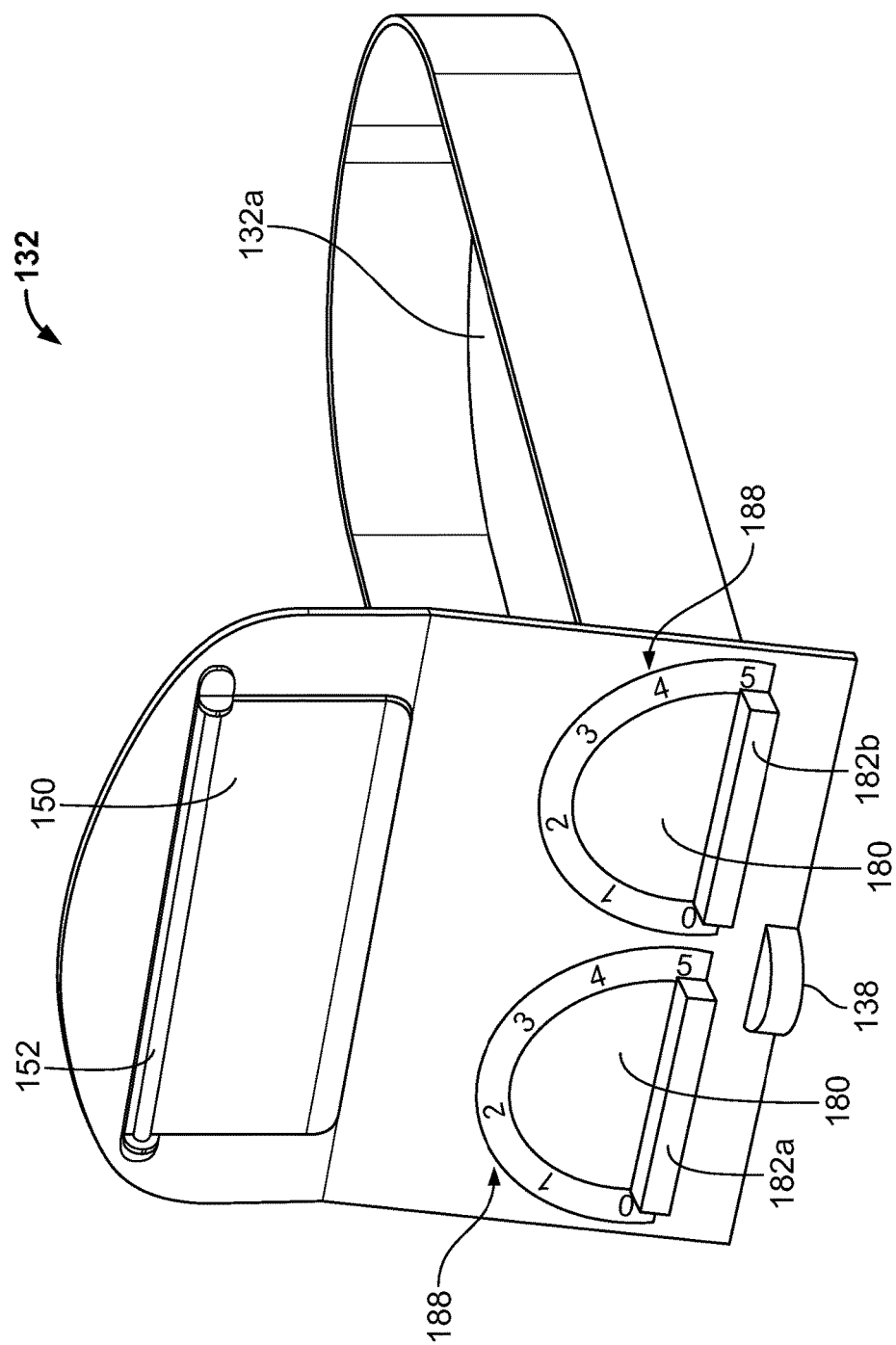
FIG. 8 is a perspective view of an ash drawer of the charcoal grill of FIG. 1, configured for use to collect and remove ashes from the charcoal grill.

With additional reference to FIG. 8, an ash drawer 132 (also termed a receptacle, a removable unit, etc.) is included for use to collect and/or clean ashes from the charcoal grill 100, for example, following cooking operation. In the illustrated embodiment, the ash drawer 132 is configured to slide in a substantially horizontal direction into and out of an opening 134 (FIGS. 5 and 6) in the base 112 of the vessel 102. For example, the ash drawer 132 can initially be positioned in the opening 134 to collect ashes from the burned charcoal (as illustrated in FIGS. 1 and 2). Here, a collection portion 132a of the ash drawer 132 is located under the fire bowl 128 to collect the ashes, with the fire bowl 128 acting to funnel the ashes through a lower opening 136 into the ash drawer 132. The ash drawer 132 can then be removed (e.g., separated, etc.) from the base 112 by sliding the ash drawer 132 out of the opening 134 (via an external grip 138) for disposing (e.g., dumping, etc.) the collected ashes. The ash drawer 132 of the illustrated charcoal grill 100 eliminates need to rake the ashes out of the base 112 (as often required by previous grill designs). A detent can be provided on the ash drawer 132 to help secure the ash drawer 132 in the opening of the base 112 when positioned for collecting ashes. For example, the detent can include a protrusion, bubble, dent, etc. on the ash drawer 132 configured to fit into a corresponding recess defined in the base 112, or any other acceptable retention mechanisms.

Figure 9:
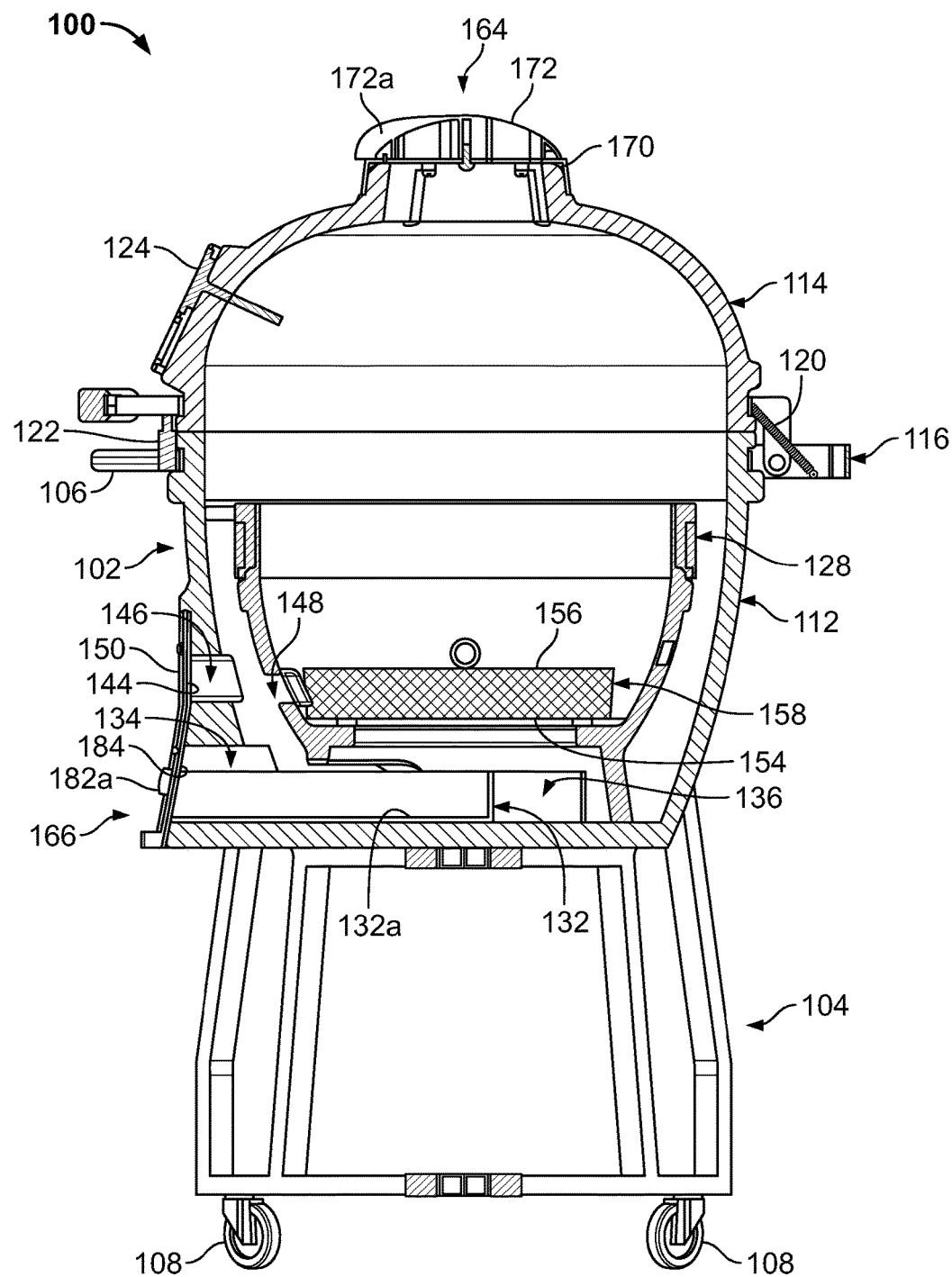
FIG. 9 is a longitudinal section view of the charcoal grill of FIG. 1.

With additional reference now to FIG. 9, the illustrated charcoal grill 100 further includes a passage extending from outside the charcoal grill 100 into an interior portion thereof to permit a starter device (e.g., an electric starter, a butane starter, a match, etc.) to be inserted through the passage for igniting the charcoal in the charcoal grill 100 (in particular, the charcoal within the fire bowl 128). The passage includes a port 144 (see also FIG. 5) defined in the ash drawer and aligned openings 146, 148 (see also FIG. 6) defined in the base 112 and the fire bowl 128. As such, the passage extends from outside the base 112 of the charcoal grill 100, through the port 144 of the ash drawer 132 (when the ash drawer 132 is positioned in the opening 134 of the base 112), and through the openings 146, 148 of the base 112 and fire bowl 128.

A cover panel 150 (see also FIG. 8) is coupled to the ash drawer 132 to selectively allow and inhibit access to the passage from outside the charcoal grill 100. In the illustrated embodiment, the cover panel 150 is pivotally coupled to the ash drawer 132 by a spring-type hinge 152 (FIG. 8) extending along a top, substantially horizontal edge of the cover panel 150. The hinge 152 allows the cover panel 150 to pivot relative to the ash drawer 132 between a closed position blocking the passage of the charcoal grill 100 (at the port 144 of the ash drawer 132) and an open position allowing access into the passage. As such, the cover panel 150 can be pivoted open when the starter device is inserted through into the passage (via the port 144) for use in igniting the charcoal, and then pivots closed (via the spring action of the hinge) when the starter device is removed. When closed, the cover panel 150 not only blocks access into the passage but also inhibits flaming embers from exiting the grill through the port 144. Alternatively, the cover panel 150 could be coupled to the ash drawer 132 differently than illustrated herein, for example, slidably coupled, removably coupled, etc.

Figure 10:
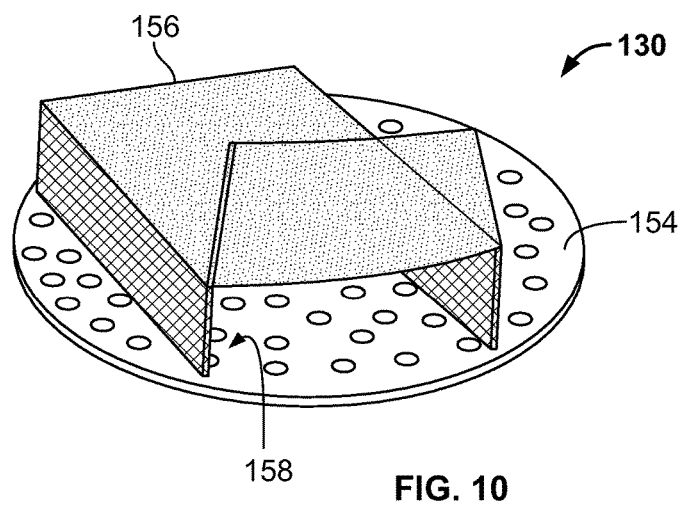
FIG. 10 is a perspective view of a grate structure of the charcoal grill of FIG. 1, configured to hold charcoal in the fire bowl of the charcoal grill and allow the charcoal to be burned for cooking operation.
Figure 11A:
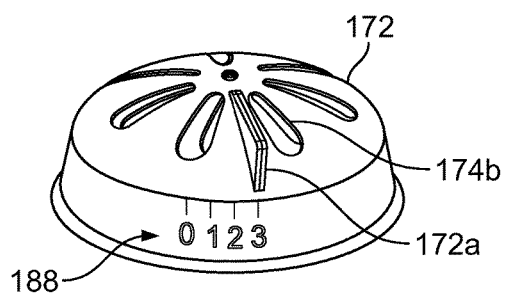
FIGS. 11A-11E are perspective views of part of an upper vent and FIGS. 11F-11J are perspective views of part of a lower vent of the charcoal grill of FIG. 1, each illustrated in various different positions for allowing different amounts of airflow through the charcoal grill.
Figure 11B:
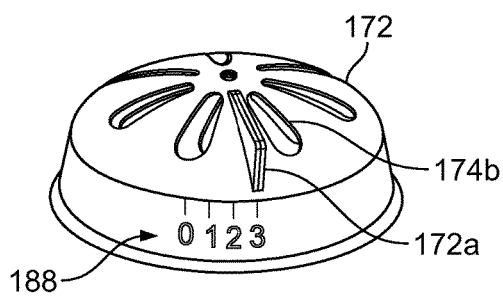
Figure 11C:
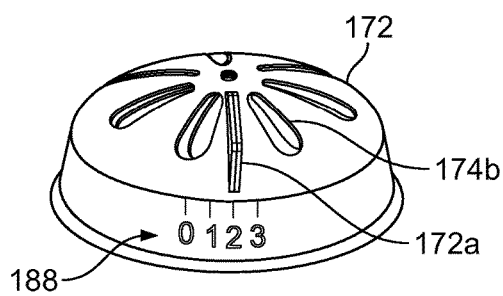
Figure 11D:
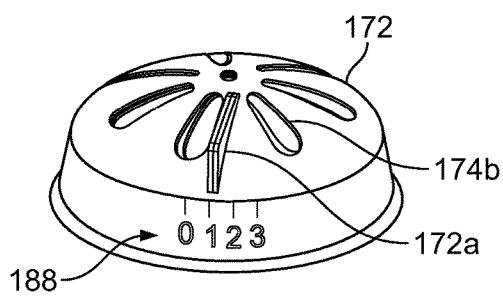
Figure 11E:
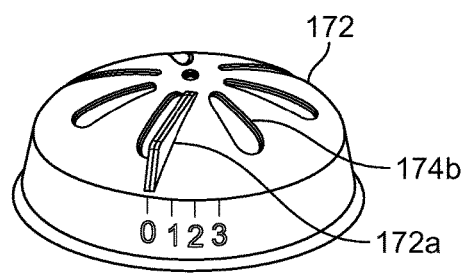
Figure 11F:
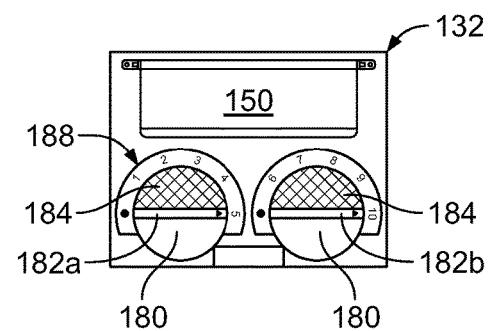
Figure 11G:
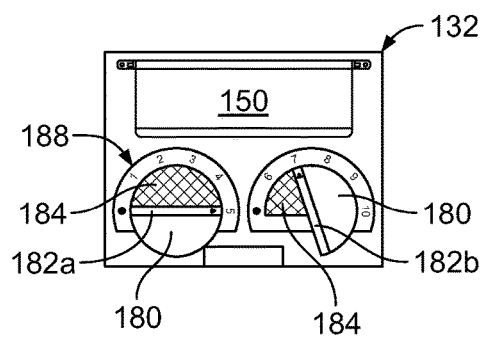
Figure 11H:
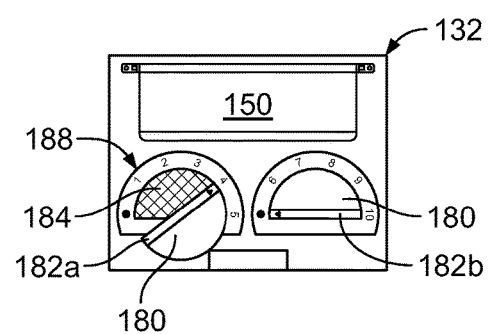
Figure 11I:
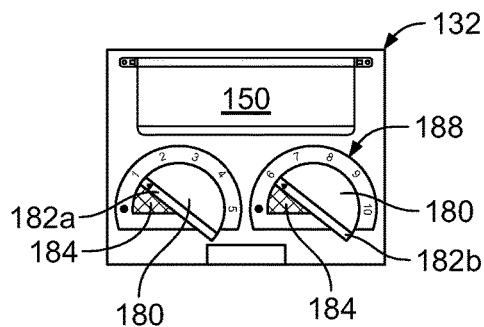
Figure 11J:
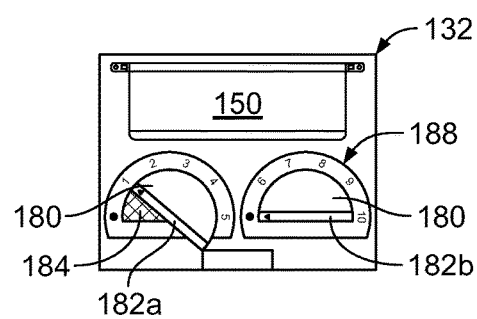

As previously described, the grate structure 130 is configured to be positioned within the fire bowl 128 to support the charcoal therein (and allow the charcoal to be burned as desired). With reference to FIGS. 9 and 10, the grate structure 130 includes a base grate 154 (also referred to as a lower grate) and a perforated cage 156 (also referred to as an upper grate) coupled thereto (e.g., via a mechanical fastener, etc.). This construction provides a two tier charcoal support that defines a pocket 158 above the base grate 154 and below the perforated cage 156, and generally under the charcoal when supported on the grate structure 130. When the grate structure 130 is positioned in the fire bowl 128 (FIG. 9), the pocket 158 is oriented in general alignment with passage of the charcoal grill 100 so that the starter device can be inserted through the passage and into the pocket 158 for igniting the charcoal on the grate structure 130. As such, the pocket 158 operates to separate the starter device from the charcoal so that the starter device can be removed from the charcoal grill 100 after igniting the charcoal without also removing burning charcoal therewith. In the illustrated embodiment, the perforated cage 156 has a generally rectangular cross-section such that the pocket 158 also includes a rectangular cross-section. However, the perforated cage 156 (and thus the pocket 158) could include other shapes as desired.

With reference now to FIGS. 1, 5, 11, and 12, the illustrated charcoal grill 100 includes a vent system for controlling airflow through the charcoal grill 100 (and thus temperature within the charcoal grill 100). The vent system includes an upper vent 164 disposed in the cover 114 of the vessel 102 and a lower vent 166 (also referred to as a temperature control panel or a temperature control zone) disposed, collectively, in the base 112 and the ash drawer 132. This allows airflow in the charcoal grill 100 generally between the lower vent 166 and the upper vent 164. Components of the upper and lower vents 164, 166 may be constructed from stainless steel, cast iron, thermally insulating materials, and/or may be powder coated as desired.

Figure 12:
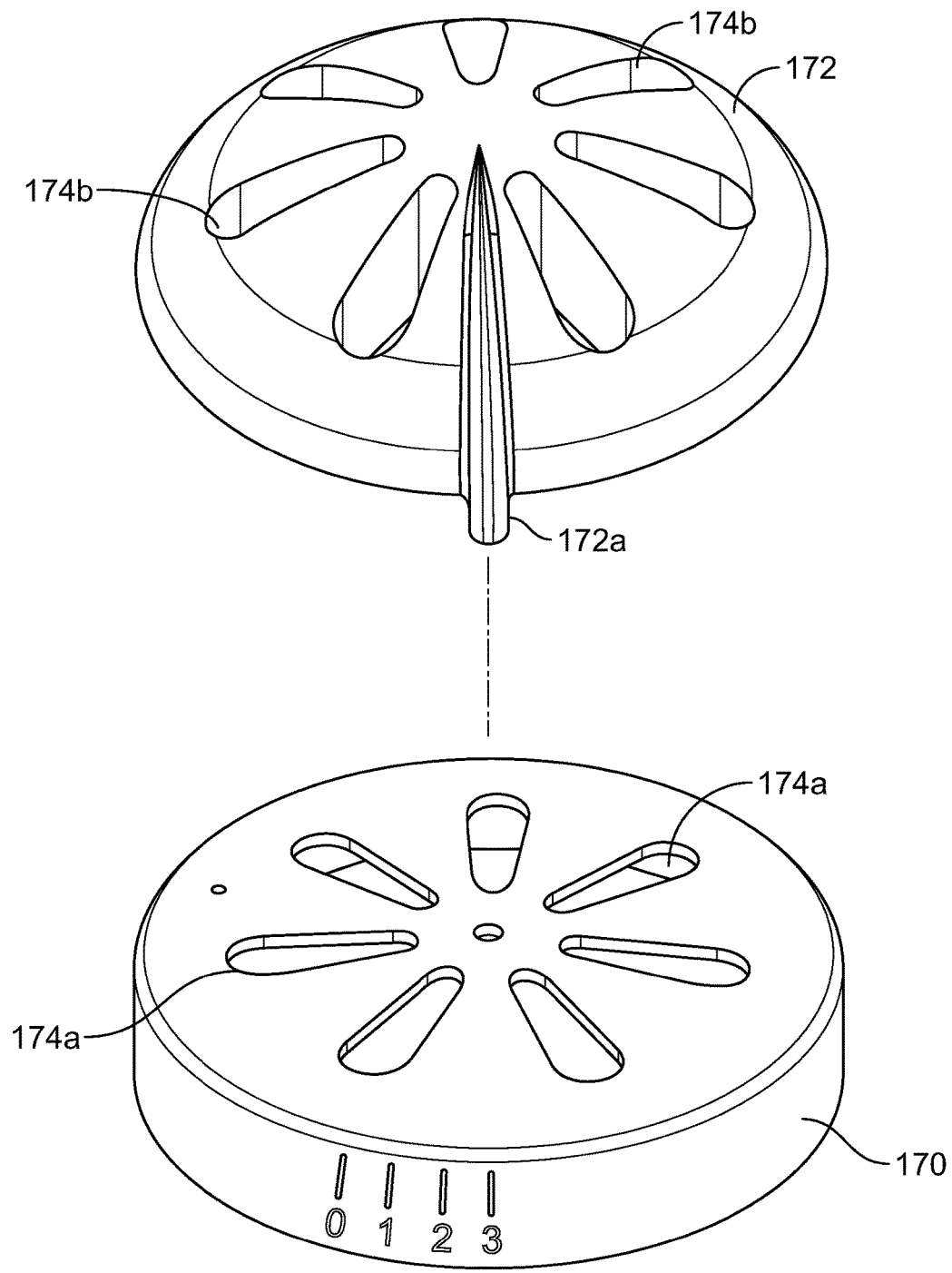
FIG. 12 is an exploded perspective view of part of the upper vent shown in FIGS. 11A-11E.

The upper and lower vents 164, 166 are each operable between a closed position (FIG. 1 and FIG. 11E) where airflow through the vent is inhibited and various open positions (FIG. 11) where airflow is allowed. The upper vent 164 includes a vent opening 168 (FIG. 5) in the cover 114, a base portion 170 positioned over the vent opening 168, and a vent cover 172 positioned over the base portion 170 (FIG. 12). The base portion 170 includes multiple slots 174a aligned with the vent opening 168 in the cover 114. And, the vent cover 172 is configured to rotate (via use of a thermally insulated handle 172a) over the base portion 170 to selectively cover the slots 174a and expose the slots 174a (by aligning slots 174b of the vent cover 172 with the slots 174a o the base portion 170), thus operating the upper vent 164 between the closed and open positions. The lower vent 166 also includes a vent opening in the vessel base 112 (which corresponds to base opening 134 and which may also be referred to as a vent opening herein) and a vent cover 180 associated with the ash drawer 132. The vent cover 180 is positioned in alignment with the opening 134 when the ash drawer 132 is located in the vessel 102 to collect ashes. In the illustrated embodiment, the vent cover 180 includes two semicircular dials 182a, 182b coupled to the ash drawer 132 and configured to rotate to selectively cover and expose the opening 134 through the ash drawer 132 (and thus operate the lower vent 166 between the closed and open position). A screen 184 is provided on the ash drawer 132 between the opening 134 and the dials 182a, 182b to inhibit embers from the burning charcoal from exiting the vessel 102 through the opening 134. In the illustrated embodiment, the dials 182a, 182b are about the same size. In other example embodiments, however, dials having different sizes may be provided to allow for different scales of adjustment of airflow through vent openings.

For example, dial 182a could be smaller than dial 182b. In that event, the smaller dial 182a could be used primarily for smoking food (e.g., with the larger dial 182b is in its closed position), and the larger dial 182b could be used for grilling and/or searing foods (e.g., while the smaller dial 182a is in its closed or open position, depending on the size of the dials 182a, 182b and the overall grill configuration). Further, each dial 182a, 182b could have one or more associated calibrations (e.g., either two sets of calibrations or a continuous series of calibrations for both dials), as further described below.

The upper and lower vents 164, 166 each include calibrations 188 provided between the closed position and the open position. The calibrations 188 correspond to different airflow through the vents 164, 166 (e.g., different volumes of airflow through the vents 164, 166, etc.). And, the calibrations 188 are provided on a graduated scale ranging from no airflow through the charcoal grill 100 up to high airflow through the charcoal grill 100 (with graduated amounts of airflow provided in between). As such, the calibrations 188 effectively define how much of each vent opening 168, 134 is exposed by the corresponding vent cover 172, 180. Example positioning of the vent covers 172, 180 of the upper and lower vents 164, 166 relative to the various calibrations 188 are illustrated in FIGS. 11A-11J.

The upper and lower vents 164, 166 can be operated individually to control airflow through the charcoal grill 100, or they can be operated in sync together (as illustrated in FIG. 11). Such control allows users to achieve specific temperatures for specific cooking operations. The calibrations 188 allow users to finitely adjust the airflow and temperature in the charcoal grill 100, and thus provide precise temperature control for different cooking operations (e.g., smoking, searing, etc.). Moreover, the calibrations 188 on the upper vent 164 and the calibrations on the lower vent 166 can be coded for specific cooking operations (based on the airflow through the charcoal grill 100 associated with the calibrations 188). In the illustrated embodiment, the calibrations 188 include numeric indicators located on non-moving parts of the vents 164, 166. In other example embodiments, calibrations may include other indicators (e.g., alphabetic indicators, pictorial indicators, etc.) and/or may be located on moving parts of the vents 164, 166.

As shown in FIGS. 2 and 5, a cooking rack 192 is also provided in the illustrated embodiment for use with the charcoal grill 100. The cooking rack 192 includes upper and lower cooking surfaces 194, 196 that together total almost 600 square inches. The upper cooking surface 194 is removably coupled to the lower cooking surface 196 such that the two surfaces 194, 196 can be separated (and separately used) as desired. The upper cooking surface 194 includes a pivotable access portion 194a that allows access to the lower cooking surface 196 (when the two cooking surfaces 194, 196 are coupled together). And similarly, the lower cooking surface 196 includes a pivotable access portion 196a that allows access to the charcoal in the fire bowl 128 when the cooking rack 192 is positioned in the vessel 102 (and when food is positioned on either the upper or lower cooking surfaces 194, 196).

Figure 13:
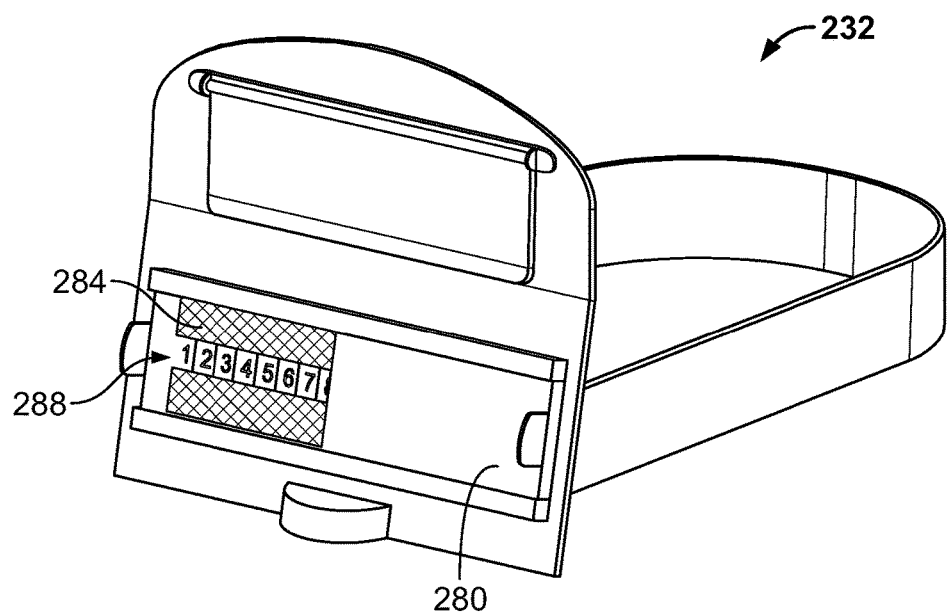
FIG. 13 is a perspective view of an ash drawer according to another example embodiment of the present disclosure.

FIG. 13 illustrates another example embodiment of an ash drawer 232 suitable for use with example embodiments of charcoal grills as disclosed herein. The ash drawer 232 is configured for use to collect and/or clean ashes from charcoal grills, for example, following cooking operation. In this example embodiment, the ash drawer 232 includes a slidable vent cover 280 for use with a lower vent of a charcoal grill. The vent cover 280 is operable between a closed position where airflow is inhibited and various open positions where airflow is allowed. Calibrations 288 are provided between the closed position and the open positions. The calibrations 288 correspond to different airflow through the vent portion of the ash drawer 232. In addition, a screen 284 is provided to inhibit embers from burning charcoal from exiting the charcoal grill through ash drawer when the vent cover 280 is open (and the ash drawer 232 is positioned in a charcoal grill).

Figure 14:
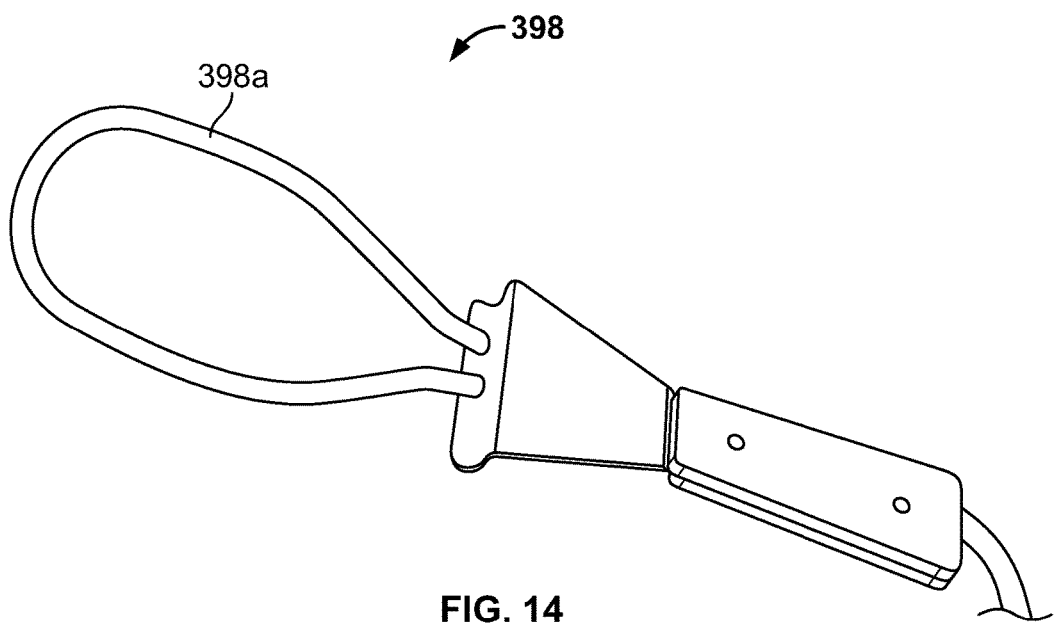
FIG. 14 is a perspective view of an electric starter suitable for use with the charcoal grill of FIG. 1 to ignite charcoal in the charcoal grill.

FIG. 14 illustrates an example electric starter 398 suitable for use with example embodiments of charcoal grills disclosed herein. As can be seen, the illustrated electric starter includes a heater coil/loop 398a configured for use to ignite charcoal in example embodiments of the charcoal grills (e.g., by way of extending through a passage of a charcoal grill, etc.).

In example embodiments of the present disclosure, suitable materials may be used in construction of different elements of charcoal grills. For example, ash drawers may be constructed from stainless steel, ceramic materials, combinations thereof, etc. Cover panels may be constructed from ceramic materials. Grate structures, support structures, other components, etc. may be constructed from stainless steel. Vent portions may be constructed from stainless steel, cast iron, etc. and/or may be powder coated.

Specific dimensions and numeric values included herein are exemplary in nature and do not limit the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grill comprising:
   an upper shell;
   a lower shell, the lower shell defining an opening therethrough, the upper shell and the lower shell together defining a cooking chamber;
   a fire bowl comprising side walls tapered inwardly at a lower portion of the fire bowl; the fire bowl being adapted to be spaced inwardly from the lower shell and supported above a bottom surface of the lower shell, and the lower portion of the fire bowl defining an opening there-through;
   a removable unit sized to be slidably received through the opening in the lower shell to position at least one portion of the removable unit under at least one portion of the opening in the lower portion of the fire bowl, wherein an outer surface of the removable unit defines at least one opening for providing airflow into the lower shell during cooking.

2. The grill of claim 1, wherein the removable unit comprises a receptacle.

3. The grill of claim 2, wherein the receptacle comprises an ash drawer.

4. The grill of claim 3, further comprising a grate configured to support a fuel source inside the fire bowl, the grate being supported in the lower portion of the fire bowl; and wherein the ash drawer is adapted to receive ashes that pass through the grate after the fuel source is burned.

5. The grill of claim 4, wherein the fuel source is charcoal or wood.

6. The grill of claim 2, wherein the grill further comprises a shock absorber affixed to the lower shell.

7. The grill of claim 2, wherein the lower shell comprises a protrusion for receiving the receptacle.

8. The grill of claim 2, wherein when the at least one portion of the receptacle is slidably received in the opening in the lower shell, the at least one portion of the receptacle is positioned on the bottom surface of the lower shell.

9. The grill of claim 1, wherein the grill further comprises a shock absorber affixed to the lower shell.

10. The grill of claim 9, wherein the shock absorber is adapted to compress when the upper shell is closed onto the lower shell; or the shock absorber is adapted to align the upper shell with the lower shell when the upper shell is closed onto the lower shell.

11. The grill of claim 1, wherein the lower shell comprises a protrusion for receiving the removable unit.

12. The grill of claim 1, wherein when the at least one portion of the removable unit is slidably received in the opening in the lower shell, the at least one portion of the removable unit is positioned on the bottom surface of the lower shell.

13. The grill of claim 1, wherein a surface of the lower shell is recessed relative to an outer surface of the lower shell.

14. The grill of claim 1, wherein:
   the lower shell comprises a surface for receiving the removable unit which abuts a surface of the removable unit when the removable unit is in a closed position; or
   the removable unit comprises a wall formed from a single layer of material; or
   the removable unit is made from metal; or
   the removable unit comprises an external grip for slidably removing the removable unit from the grill; or the removable unit comprises a detent to secure the removable unit under the at least one portion of the opening in the lower portion of the fire bowl.

15. The grill of claim 14, wherein the surface for receiving the removable unit and the surface of the removable unit are planar.

16. The grill of claim 14, wherein the outer surface of the removable unit defines the at least one opening for providing airflow into the lower shell, and either the at least one opening is a portion of a screen, or the at least one opening is beneath a vent cover that is movable between an open position, a closed position and other intermediate positions to cover or expose at least one portion of the at least one opening.

17. The grill of claim 1, wherein the upper shell comprises a vent and wherein the vent is positioned vertically above the at least one portion of the opening in the lower portion of the fire bowl when the upper shell is closed onto the lower shell.

18. The grill of claim 1, wherein the removable unit further comprises a vent system, the vent system comprising:
   the at least one opening defined by the outer surface of the removable unit; and
   a vent cover movable between an open position, a closed position and other intermediate positions;
   wherein the vent system allows for ambient air to pass through the at least one opening defined by the outer surface of the removable unit and along the removable unit before entering the fire bowl.

19. The grill of claim 18, wherein the vent cover of the vent system is movable between positions to provide calibrated vent settings; or the vent system comprises the vent cover which is rotatable or slidable; or a vent of the upper shell and the vent system are configured to be operated together; or the vent of the upper shell and the vent system are configured to achieve a temperature for a cooking operation; or the vent of the upper shell and the vent system are configured with respective numeric indicators, alphabetic indicators, or pictoral indicators; or a moving part of the vent of the upper shell is configured with an indicator and a non-moving part of the vent system is configured with a corresponding indicator.

20. The grill of claim 1, further comprising a support for the fire bowl, the support being adapted to be positioned between the lower portion of the fire bowl and the bottom surface of the lower shell.

21. The grill of claim 1, wherein the upper shell and the lower shell are substantially constructed from a clay, ceramic, refractory material, earthen material, cement rock, or terra cotta composition.

22. The grill of claim 1, wherein the lower portion of the fire bowl comprises a floor, the floor defines the opening through the lower portion of the fire bowl, and the at least one portion of the removable unit is positioned under the at least one portion of the opening through the lower portion of the fire bowl when the at least one portion of the removable unit is slidably received in the opening in the lower shell.

23. The grill of claim 1, further comprising at least two cooking surfaces in the cooking chamber.

24. The grill of claim 23, wherein one of the at least two cooking surfaces is spaced above the other of the at least two cooking surfaces.

25. The grill of claim 1, wherein the removable unit is sized to be slidably received through the opening in the lower shell to position the at least one portion of the removable unit under the entire opening in the lower portion of the fire bowl.

* * * * *